(12) United States Patent
Berglin

(10) Patent No.: US 8,537,400 B2
(45) Date of Patent: *Sep. 17, 2013

(54) METHOD AND ARRANGEMENT FOR USE OF SHARED RESOURCES IN A NETWORK

(75) Inventor: Patrik Berglin, Amal (SE)

(73) Assignee: Cirrato Technologies AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/200,948

(22) Filed: Oct. 5, 2011

(65) Prior Publication Data

US 2012/0147417 A1 Jun. 14, 2012

Related U.S. Application Data

(63) Continuation of application No. 10/531,872, filed as application No. PCT/SE03/01663 on Oct. 28, 2003, now Pat. No. 8,054,485.

(30) Foreign Application Priority Data

Oct. 28, 2002 (SE) ...................................... 0203165

(51) Int. Cl.
*G06F 15/00* (2006.01)

(52) U.S. Cl.
USPC ....... 358/1.15; 358/1.14; 358/1.16; 358/1.17; 714/18; 709/225

(58) Field of Classification Search
USPC ............... 358/1.14, 1.15, 1.16, 1.17; 714/18; 709/225
See application file for complete search history.

(56) References Cited

U.S. PATENT DOCUMENTS

| | | | |
|---|---|---|---|
| 6,115,132 A | 9/2000 | Nakatsuma et al. |
| 6,611,875 B1 | 8/2003 | Chopra et al. |
| 7,349,905 B1 | 3/2008 | Jooste |
| 2002/0062453 A1 | 5/2002 | Koga |
| 2002/0067504 A1 | 6/2002 | Salgado et al. |
| 2002/0114322 A1 | 8/2002 | Xu et al. |
| 2003/0120810 A1 | 6/2003 | Ohta |
| 2003/0212789 A1 | 11/2003 | Hamel et al. |
| 2004/0039781 A1 | 2/2004 | LaVallee et al. |

FOREIGN PATENT DOCUMENTS

| | | |
|---|---|---|
| CN | 1352765 | 6/2002 |
| GB | 2 331 387 | 5/1999 |
| JP | 2002-0202873 | 7/2002 |
| KR | 1997-7004182 | 8/1997 |
| KR | 1999-0051350 | 7/1999 |
| KR | 2001-0114147 | 12/2001 |
| WO | WO 96/03692 | 2/1996 |
| WO | WO 99/38068 | 7/1999 |

OTHER PUBLICATIONS

International Search Report dated Dec. 14, 2004 issued in corresponding International Application No. PCT/SE2003/001663.
Canadian Office Action dated Dec. 5, 2012 issued in Canadian Application No. 2,792,175.

*Primary Examiner* — David K Moore
*Assistant Examiner* — Mark Milia
(74) *Attorney, Agent, or Firm* — Harness, Dickey & Pierce, P.L.C.

(57) ABSTRACT

A method for controlling and monitoring, from a server, transfers of jobs from clients connected in the network to shared resources connected in the network.

35 Claims, 7 Drawing Sheets

METHOD AND ARRANGEMENT FOR USE OF SHARED RESOURCES IN A NETWORK

PRIORITY STATEMENT

This application is a continuation Application of application Ser. No. 10/531,872, filed Apr. 19, 2005, which is a National Phase of PCT Patent Application No. PCT/SE03/01663, filed on Oct. 28, 2003, which claims priority under 35 U.S.C. §119 to Sweden Patent Application No. 0203165-6, filed on Oct. 28, 2002, the contents of each of which are hereby incorporated by reference in their entirety.

TECHNICAL FIELD OF THE INVENTION

The present invention relates to a technique for use of shared resources in a network by a client connected in the network. The technique is particularly, but not exclusively, designed for direct transfer of print jobs from the client to a printer connected in the network.

Specifically, the invention relates to a method for controlling and monitoring from a server use of a shared resource by a client connected in the network, a computer program product for performing said method of controlling and monitoring use, a server having said computer program product for performing said method of controlling and monitoring use of shared resources installed, a method for use of a shared resource in a network by a client, a computer program product for performing said method of use of shared resource, a client terminal having said computer program product for performing said method of using a shared resource installed, and a network comprising a plurality of said client terminals and at least one of said server.

RELATED ART

A conventional printing system for networks is based on the principle of storage of print jobs on a server, which involves that a client in a network sends each print job to a print server, which receives a print job, processes the print job and sends it further to a printer for printing.

In FIG. 1 an example of such a network is shown. The network comprises a number of clients or user computers 101, which together with a number of printers 103 are connected in a client network 105. The client network 105 is in turn connected to a server network 107, optionally via a router 109. The server network 107 comprises, inter alia, a number of central print servers 111, which monitor and control print jobs from the clients 101, and send them to the printers 103.

The client sends a print job to one of the print servers 111, which is schematically indicated by arrow 113. The amount of data, which is sent, is typically three times as big as a corresponding file is on the local hard disk drive of the client. When the print job reaches the print server 111 it is locally spooled onto the hard disk drive of the print server, which requires storage space on the server. When the print server 111 has spooled the print job onto the correct print queue (i.e. in the queue for the selected printer) and when it is time for the current print job to be printed, the print server 111 sends the print job to the selected printer for printing, which is schematically indicated by arrow 115.

As being illustrated in FIG. 1, the print job is not sent the shortest distance to the printer, but makes a detour via a print server 111.

WO 99/38068 describes a job token printer assignment system for print jobs, wherein a client sends a token to a print server, which comprises the profile of the print job, which is to be printed. The print server parses the token, determines an appropriate printer for the print job, and returns a selected printer token to the client, which includes the network address and name of the selected printer. The client then sends the print job, accompanied by the selected printer token, to the appropriate printer. In this way, the print job is assigned to a proper printer for the print job by the print server.

SUMMARY OF THE INVENTION

The inventors of the present invention have realized that a problem with the above said concept using print servers is that the number of print queues and the number of print jobs, which can be handled by each print server, is limited to the amount of memory, the processing capacity and the storage space of the server. When the print server is heavily loaded the print jobs are handled slower.

Large networks require a large number of print servers, which involves increased costs in the form of hardware, software and operation and maintenance.

Another problem with the known print server concept is that the print job is sent over a network twice: one time from the computer to the print server and then another time from the print server to the printer to be printed. This implies an increased need of bandwidth, which can be demanding and thus costly, particularly in large networks or in networks where the printing frequency is high.

The job token printer assignment system described in WO 99/38068 solves indeed the problem of sending the print job twice over the network. The print server has not to spool a large print job, but needs only to identify the features comprised in the token from the client and assign the print job to an appropriate printer. It seems though like that the system described in WO 99/38068 is related to a system for editorials and the like, where printing of books or other is performed in a larger number and where no flexibility regarding the printings is necessitated. The system described in WO 99/38068 does for instance not allow the clients to select a printer among many and cannot parse the selected printer to see if it has printing capacity by the moment. The system neither manages to handle print queues nor controls the printings in dependence on how the print jobs advance in the different queues. Further, it has no capability to handle several print jobs from the client simultaneously, nor capacity to monitor how the print jobs are actually performed, particularly if/when they are completed. Furthermore, the inventors of the present invention have realized that similar problems generally occur when shared resources are used on the network. For instance, in the case where a device to store data on a data storage medium in the network, for instance a CD or DVD recorder (writer), where a job shall be sent to the shared resource for recording, a control and supervision may be performed from a server similar to the above described print server, which leads to the same kind of problems. Alternatively, the shared resource is connected in the network in a manner, which only allows a single client at a time to use the resource, and wherein no queue at all exists.

It is thus an object of the present invention to provide a technique for transfer of jobs from a client connected in a network to a shared resource connected in the network and selected by the client, particular a printer, a telefax apparatus, a projector, or a device for storing data on a storage medium, which lacks the above said problems and limitations.

In this respect there is a particular object of the invention to provide such a technique for direct and flexible transfer of jobs from the client connected in the network without there being a risk of losing jobs.

There is a further object of the present invention to provide such a technique, which is simple, robust and reliable.

There is a further object of the present invention to provide such a technique which makes use of a minimum of hardware and software and which simultaneously is capable of handling jobs in large networks and in networks where use of said shared resources is high.

There is yet a further object of the present invention to provide such a technique by using methods for, from a server, controlling and monitoring transfers of jobs from a client connected in a network to a shared resource connected in the network and selected by the client, computer program products for performing the methods, servers and client terminals having the program products installed, and networks comprising the servers and the client terminals.

The above said objects are attained, according to the present invention, by means of methods, computer program products, servers, client terminals, and networks in accordance with the appended patent claims.

A ticket-based centralised server system is used to control the client and his/her transfers of jobs to the shared resource. The technique is unique since the programs, which control the flow of jobs, exist both on the client and on a centralised ticket server. The programs start and stop the use of the shared resource by the client, and the flow of jobs is controlled from the ticket server.

A unique identity is assigned to the jobs by the server, which informs the client of the unique identity. Hereby, the client may initiate several jobs, to be performed by the shared resource, closely after each other, and these jobs are handled individually by the ticket server.

A confirmation that the respective job has been completed successfully by the shared resource, or an indication that the job has not been successfully by the shared resource, is received by the ticket server from the client, after which the corresponding request is removed from the queue.

Preferably, updated status information regarding the completion of the job by the shared resource repetitively during use of the shared resource by the client, where absence of such updated status information at the ticket server indicates an operation error at the client or a communication error in the communication between the client and the ticket server. This will trigger the ticket server to examine the situation and to attend to the problem, or to change status for the job and/or for the shared resource. The job may or may not be removed from the queue. The server may have a timer installed, wherein different actions may be triggered by different delays.

By using a ticket-based system the network utilization is limited heavily in contrast to the case where the network is used twice.

The inventive technique is also lessening the load on the centralised server by means of the fact that the client processes the use and sends any data directly to the shared resource instead of sending it to the server, which in turn sends it further to the shared resource.

Further, the ticket-based concept involves an increased capability of changing priorities of jobs. If for instance a job is interrupted before it has been given a green light, the job needs not to be sent on the network at all—in contrary to the known technique where transfers of print jobs are always sent from a client to a print server.

The proposed concept also makes use of the capacity surplus and the parallel processing capacity that exist on the clients of today, which typically are personal computers. In many of the larger office environments powerful personal computers are used for simpler processing such as e-mail handling, word processing and Internet browsing. These computers are very suitable for background communication with a ticket server and at a green light from the ticket server, initiate transfer of the job to the shared resource.

Further advantages of the invention, and characteristics thereof will be evident from the detailed description of preferred embodiments of the present invention given hereinafter and the accompanying Figures, which are given by way of illustration only, and are thus not limitative of the present invention.

Figure 1:
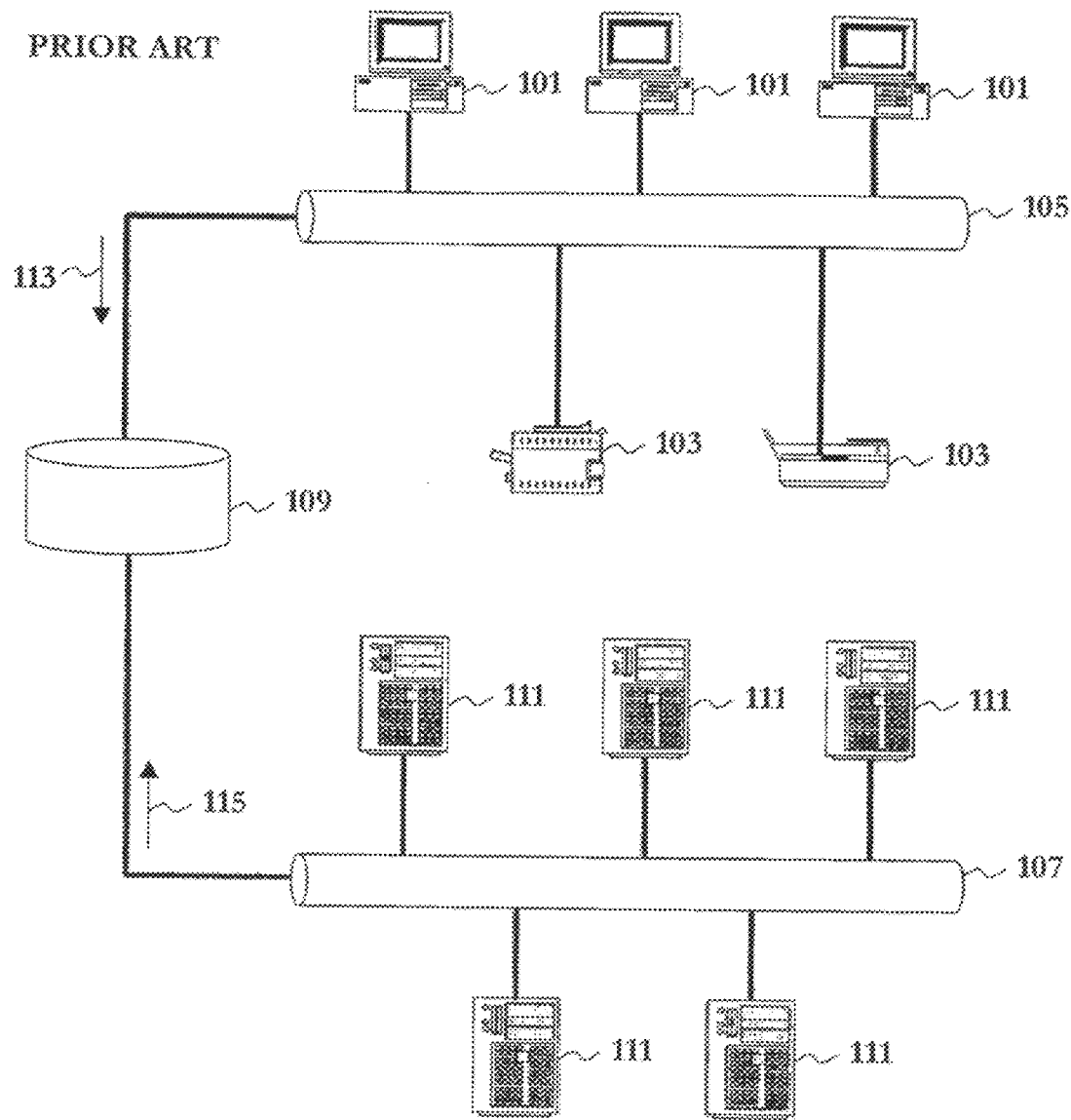
FIG. 1 illustrates schematically a network, wherein a printing technique according to the prior art is implemented.
Figure 2:
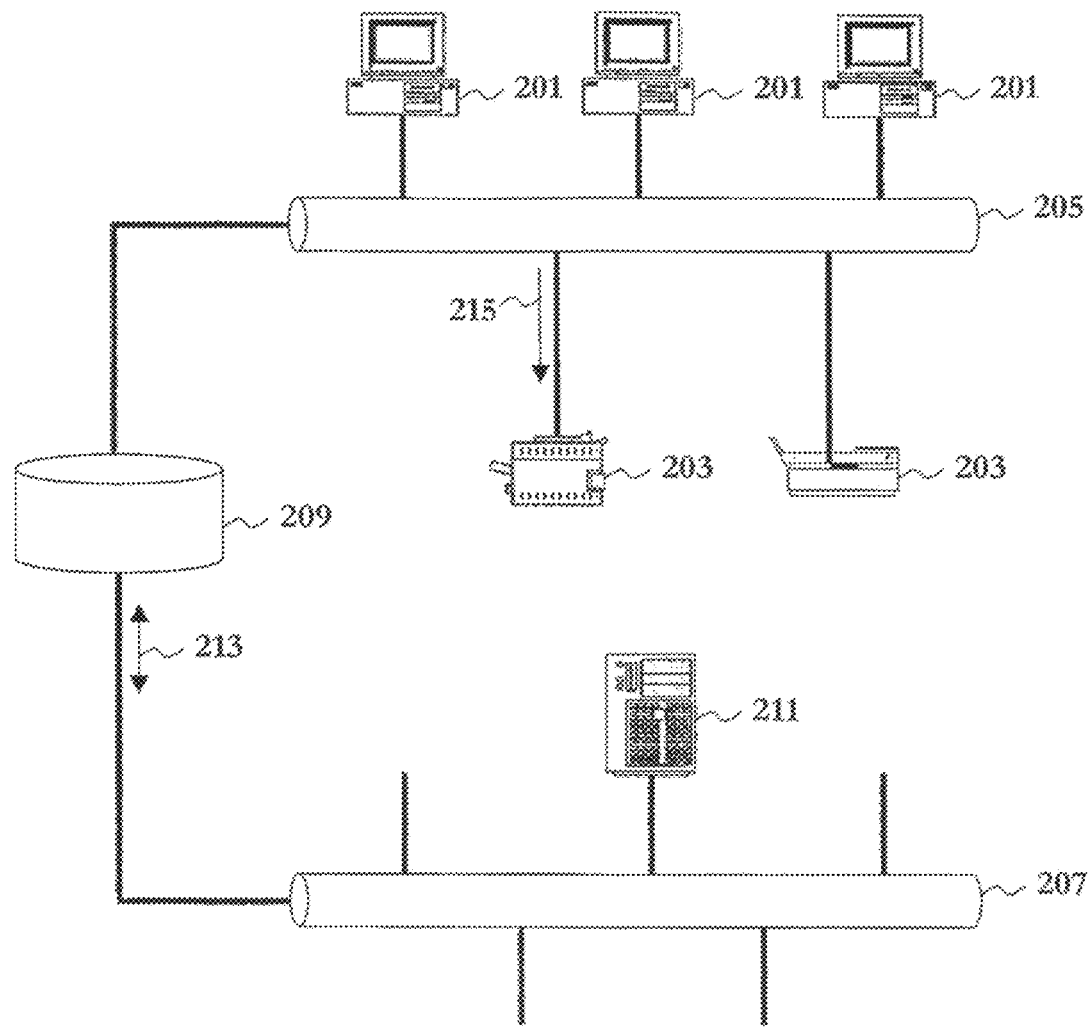
FIG. 2 illustrates schematically a network, wherein an embodiment of the present invention is implemented.

Short Description of FIG. 2:

2-1. The client sends a request to the print server for a job ID in order to print on a selected printer.

2-2. The ticket server has all information regarding the status of the printers in a real time database and if the selected printer is active on the network the ticket server sends a job ID to the client.

2-3. The client receives its job ID and performs the printing on the printer.

2-4. At most 20 kb data is sent between the client and the ticket server.

FIGS. 3-7 are flow diagrams showing different aspects of a preferred embodiment of the present invention.

Figure 3:
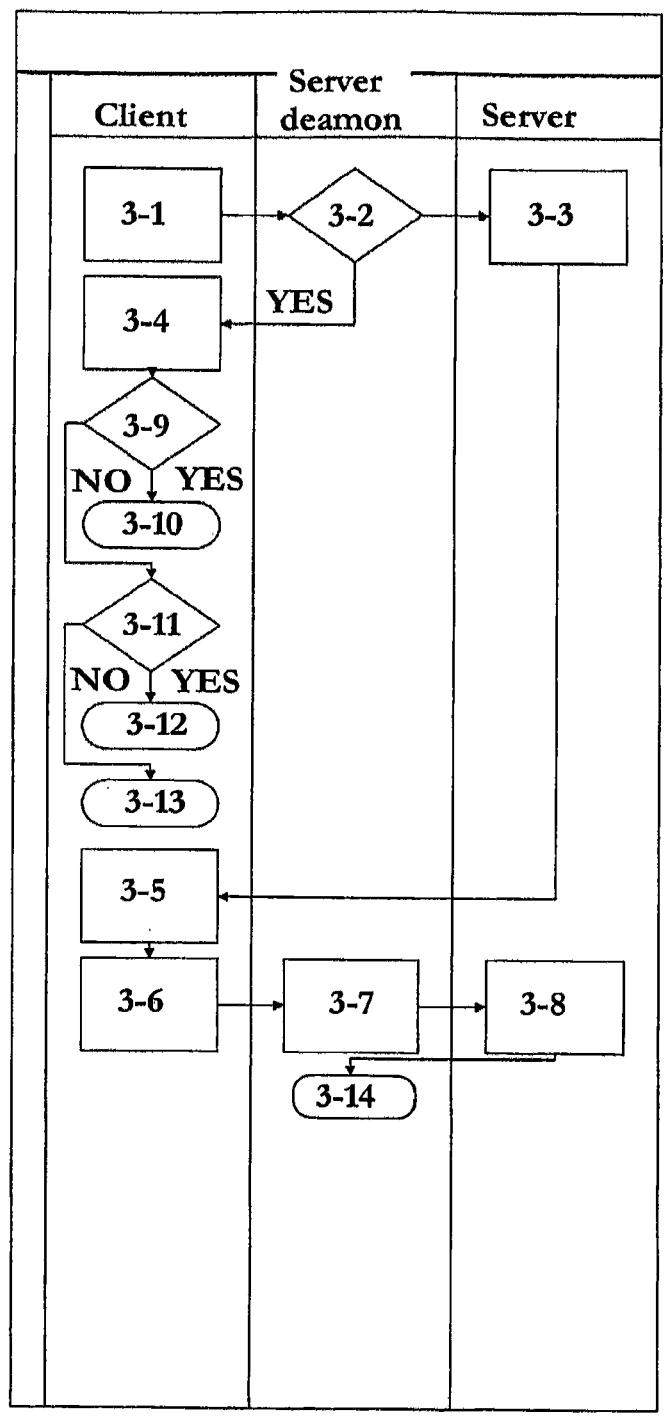

Short Description of FIG. 3:

3-1. Send sequence, DLL version, print driver version, printer name, user name and user domain.

3-2. Check the information received in step 1 to see if something is too old or if the user has not access to print, go to step 4.

3-3. Put the data received in step 1 in the database, fetch the unique value generated by the SQL server and send it back to the client.

3-4. Read the error code and check what has to be attended to, if a version of something is old, fetch a newer version. After having performed the updating, request the user to print again.

If the user has not access to print on a selected printer the user may have to perform an interactive selection, where the user can select what has to be done with the printing: cancel or move to another printer.

3-5. Receive job ID.

3-6. Send sequence, IP address, number of pages, size of print job, job identification, front end paper version and configuration file version.

3-7. Process data.

3-8. Update information for the print job in the database, send confirmation to client.

3-9. Does not the user have access?

3-10. Give the user possibility to move the print job to another printer or to cancel the job completely. If the user selects to move the print job to another printer, the client has to start over again from step 1.

3-11. Was client too old?

3-12. Fetch new version of the client, and then the client has to be restarted if the client is run as a service.

3-13. Print driver version was too old, update print driver and start the client.

3-14. Shut down TCP/IP connection if not NAT.

Figure 4:
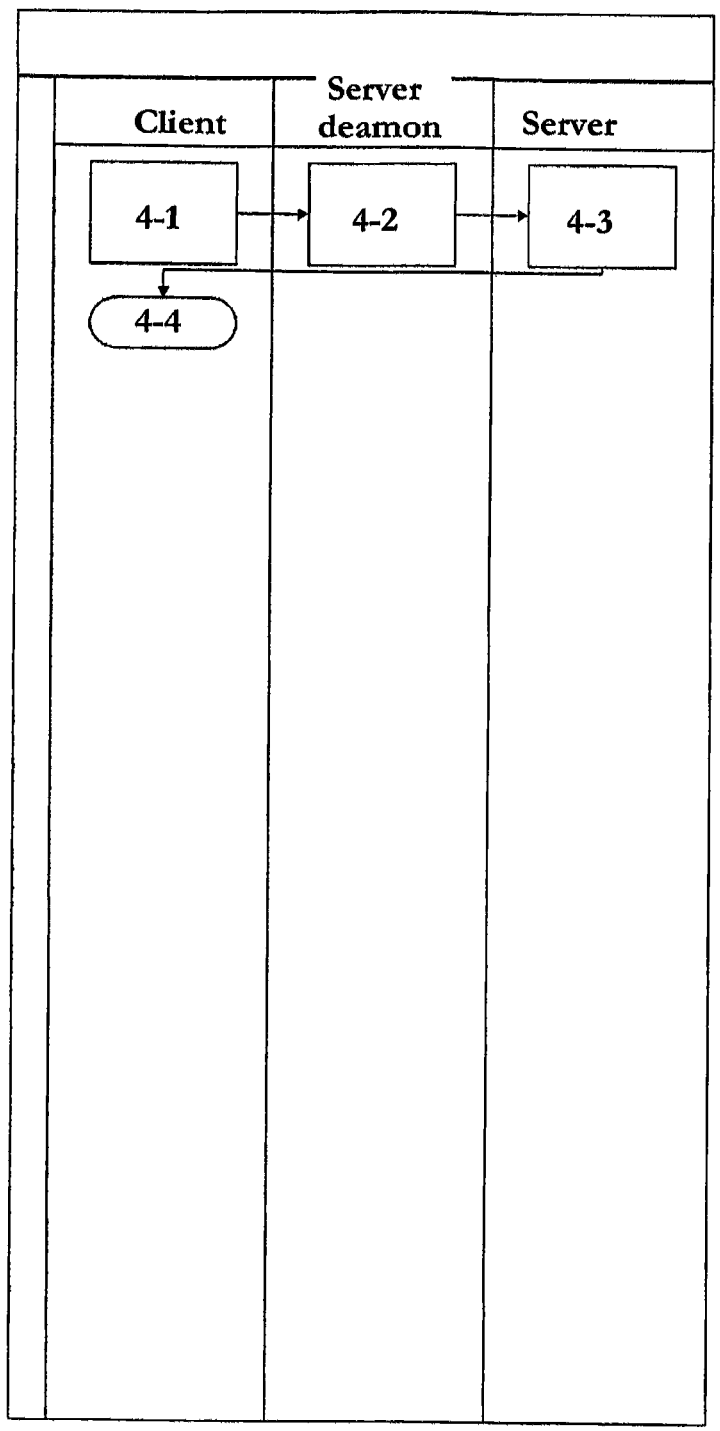
Figure 5:
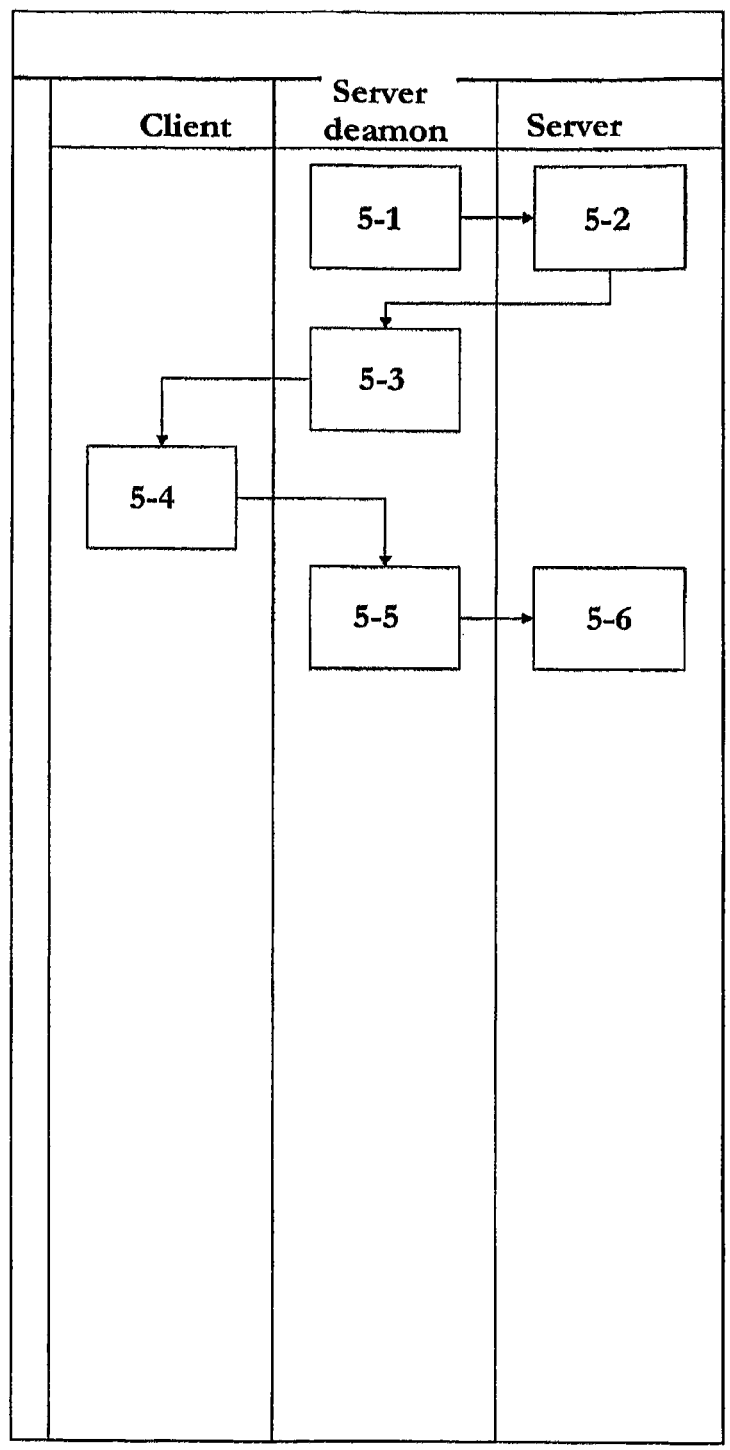

Short Description of FIG. 4:
4-1. Send sequence, job ID, error code for request to cancel print job.
4-2. Process data.
4-3. Cancel print job from database and tell client to cancel job.
4-4. Cancel job from disk/memory.
Short Description of FIG. 5:
5-1. The server requests to interrupt print job.
5-2. Change status of print job in database to "interrupt".
5-3. Send sequence to client to request cancellation of the print job.
5-4. Cancel print job and tell printer that the job is cancelled from the client.
5-5. Process data.
5-6. Cancel print job from database.
Short Description of FIG. 6:
6-1. Fetch first job from print queue (sorted after the oldest job and then priorities).
6-2. Highlight job for printing.
6-3. Tell client to start printing, information which is to be sent is sequence number, job ID, printer IP address and which function shall be used for printing.
6-4. Could the printing be started?
6-5. Process data.
6-6. Update status of job to "printing".
6-7. Is the number of attempts larger than the maximum number of allowed attempts?
6-8. Wait a predetermined number of seconds, go then to step 4.
6-9. Error code is sent to the server. For instance the client could not connect to the printer.
6-10. Process data.
6-11. Update information in database according to information received from client, check printer by daemon controlling printers.
6-12. Could the printing be performed without any errors from the printer?
6-13. Process data.
6-14. Move information of print job to separate table in the database so that it later can be used to generate statistics and possibly invoicing information.
6-15. Send error code to server.
6-16. Process data.
6-17. Update information in database and highlight job as failed, check printer by daemon controlling printers.
Short Description of FIG. 7:
7-1. Has the queue stopped to operate?
7-2. Inform support organization.
7-3. Inform all clients having print jobs awaiting on the printer that the printer is not operating.
7-4. Show a dialogue window for the client, where the client receives a possibility to cancel the job, to move the job to another printer, or to wait until the printer is operating again.
7-5. The client wishes to remove the job?
7-6. Process data.
7-7. Cancel job from database.
7-8. The client wants to move the job to another printer?
7-9. Has the client access to print on the selected printer?
7-10. Is the selected printer operating?
7-11. The client is waiting for the printer to start operate again.
7-12. Move the print job to selected queue.
7-13. Tell user that the user has not access to print on the selected printer, start over again from step 4.

PREFERRED EMBODIMENTS

In the following description, for depicting and not limiting purposes, specific details are set forth, such as particular applications, techniques, methods etcetera in order to provide a thorough understanding of the present invention. It shall, however, be readily apparent to the man skilled in the art that the invention can be practised in other embodiments deviating from these specific details. In other instances detailed descriptions of well-known methods, protocols, devices or circuits are omitted in order not to obscure the present description with unnecessary details.

The description is divided into five different sections, the first of which generally describes the main properties of a technique for direct printing on networks according to a preferred embodiment of the present invention. Then, detailed descriptions of preferred embodiments of the ticket server and the client, respectively, follow. Thereafter, different alternatives to a printer for use as a shared resource according to the present invention are described. Finally, a number of advantages of the technique is listed.

1. General Description of a Technique for Direct Printing in Networks According to a Preferred Embodiment of the Present Invention In FIG. 2, an example of a network is shown, wherein the printing technique according to the present invention is implemented. The network comprises a number of clients or user computers 201, which together with a number of printers 203 are connected in a client network 205. The client network 205 is in turn connected to a server network 207, optionally via a router 209. The server network 207 comprises i.a. a ticket server 211, which monitors and controls the printings from the clients 201 on the printers 203.

The printings are performed according to the following. The client, who desires to print on a selected printer, sends a request to the ticket server 211 to obtain a green light in order to print a print job on the printer. If the printer is available and active, i.e. it can receive a print job, the ticket server 211 sends a go-ahead to the client and the client, thus receiving the go-ahead, sends the print job directly to the selected printer for printing. For this purpose the ticket server 211 monitors the printer and has thus information whether the printer is active or inactive, and if it is occupied with print jobs from the same or another client on the network.

If the printer is occupied, the request is placed in a queue by the ticket server 211. This queue is updated continuously, and when the above print job is next to be printed the ticket server 211 sends a go-ahead to the client, which may send the print job directly to the printer for printing.

In FIG. 2 the bidirectional arrow 213 indicates the signalling between the ticket server 211 and one of the clients 201, while arrow 215 indicates the transferring of the print job from the client to the selected printer 201.

The print job is assigned an identity, which is sent to the client, so that the client can associate an identity with the print job. Then, when the ticket server 211 sends the go-ahead to the client, the identity is comprised therein so that the client can send the correct print job to the printer (if the client has several print jobs active). A confirmation that the assigned identity has been received by the client can be sent back to the ticket server 211.

Furthermore, the client may send a confirmation to the ticket server 211, when it has received the go-ahead to print. This confirmation can also comprise an indication that the print job has been sent or will be sent by the client. A further confirmation when the print job has been completed may be sent from the client to the ticket server 211, or in the case the print job has not been completed successfully, an indication of this may be sent from the client to the server, after which the server can remove the request from the queue.

Preferably, updated status information regarding the completion of the print job is sent from the client to the ticket server 211 repetitively, particularly on a regular basis, while the printing is active, wherein absence of such updated status information at the ticket server 211 (i.e. if the time between two status updates has been exceeded) indicates that an operation error of the client, or that a communication error in the combination between the client and the ticket server 211, has occurred (program error or network error). This triggers the ticket server to examine the situation (e.g. examine the printer), and attend to the problem or change status of the job and/or the printer. The job may or may not be moved from the queue. The server may have a timer installed, wherein different actions can be trigged by the different delays. If errors are indicated the administrator of the system is informed.

Further, information regarding status of the printer may be sent from the ticket server 211 to the client to keep the client updated. More about this follows below.

The amount of data, which is sent between the client and the ticket server 211, is typically at most 20 kb (in the version developed by applicant and which is described in detail below) and this creates possibilities to save much bandwidth and simultaneously centralize the ticket server 211 to one site in the network only, even if the network is large.

2. Detailed Description of a Preferred Embodiment of a Ticket Server

A detailed description of the ticket server for controlling and monitoring transfers of print jobs from a client to a printer according to the present invention follows below. Note that in both this and the following section, the function of the invention and the communication between the server and the client is described. References to the flow diagrams in FIGS. 3-7 are indicated in parenthesis where appropriate (the steps in the flow diagrams are given by a figure corresponding to the number of the figure followed by a dash and a serial number).

The ticket server comprises the following parts:
Computer
Database
Program receiving requests of print jobs from client
Program handling print queues
Program or server daemon for checking printer status
Software making file and printer sharing possible for Windows, OS/2 and DOS clients
Program for replication of data between a number of ticket servers.

In the description below, it is assumed that the network is a TCP/IP-based network. After modifications, the invention is obviously applicable for any kind of network.

Printing: First Stage (FIG. 3)

Initialization of the printing is performed by the client. When the ticket server receives a message from a client with a request for a print job, the ticket server receives the following data from the client (step 3-1):
Sequence number
Client version number
Operative system
Printer driver version
Printer name
User domain
User name When the server has read the information that the client has sent, a sanitary check of the client data is performed, i.e. the information is checked according to the following rules (step 3-2), and if something is erroneous, an error code is generated (step 3-4, and step 3-9-step 3-13).

It is checked whether the data received is complete. If this is not the case an error code is sent to the client requesting the information. If the client software is old, the client can be forced to upgrade its client software. In such a case an error code for this is sent. Further, it is checked whether the printer driver, which the client is using, is unsuitable in some manner, e.g. if a bug or similar has been found in the driver so that it should be changed immediately. If so, an error code for this is sent. Finally, it is checked whether the user has access to print on the printer (step 3-9). If this is not the case an error code is sent to the client, which is invited to select another printer.

If an error code is to be sent, it is sent according to the following:
Sequence number (corresponding to an error code being sent)
Error code The error is logged and the print attempt results normally in no further actions from the part of the server, but a new print attempt has to be generated by the client.

If all information was correct, the server is entering information in the database and receives a unique identifier back from the database (step 3-3). This is used in later communications between the client and the server. Also the print job is "marked" with this identifier in order for the client to know which print job is regarded (since the client has to be capable of handling several print jobs simultaneously, the client has to have an identifier for each print job to prevent sending an incorrect print job to an incorrect printer).

The identifier is sent back to the client in a sequence according to the following:
Sequence number
Job ID (the above said identifier).

When the client has received the above sequence (step 3-5), it sends back data describing the print job more in detail (step 3-6). The information, which is received from the client, is:
Sequence number
The IP-address of the client
Number of pages
Number of bytes (size of the print job)

The received data is processed by the server (step 3-7), and the information of the print job is updated in the database (step 3-8).

The IP-address of the client is sent in order for the server to decide whether the client is on a so-called NAT (Network Address Translation) network. This is done since it is often very difficult to re-establish a connection in a different direction, i.e. from the server to the client if the client is on a NAT network. If so is the case, the connection will be hold open until all communication regarding the print job is completed (i.e. until all steps in this description are performed). In normal instances, i.e. if the client is not on a NAT network, the connection is closed between the different sessions in order to make an optimum printing technique without any unnecessary signalling overhead possible.

The number of pages and the number of bytes are collected in order partly to see how large print jobs are being sent, partly for registration for statistical reasons.

The server responds to the client with a sequence, wherein it tells the client that the server is ready and that the client should wait for further information from the server (step 3-8).

The sequence is:

Sequence number

The connection between client and server is then closed, unless the client is on a NAT network, see above.

Figure 6:
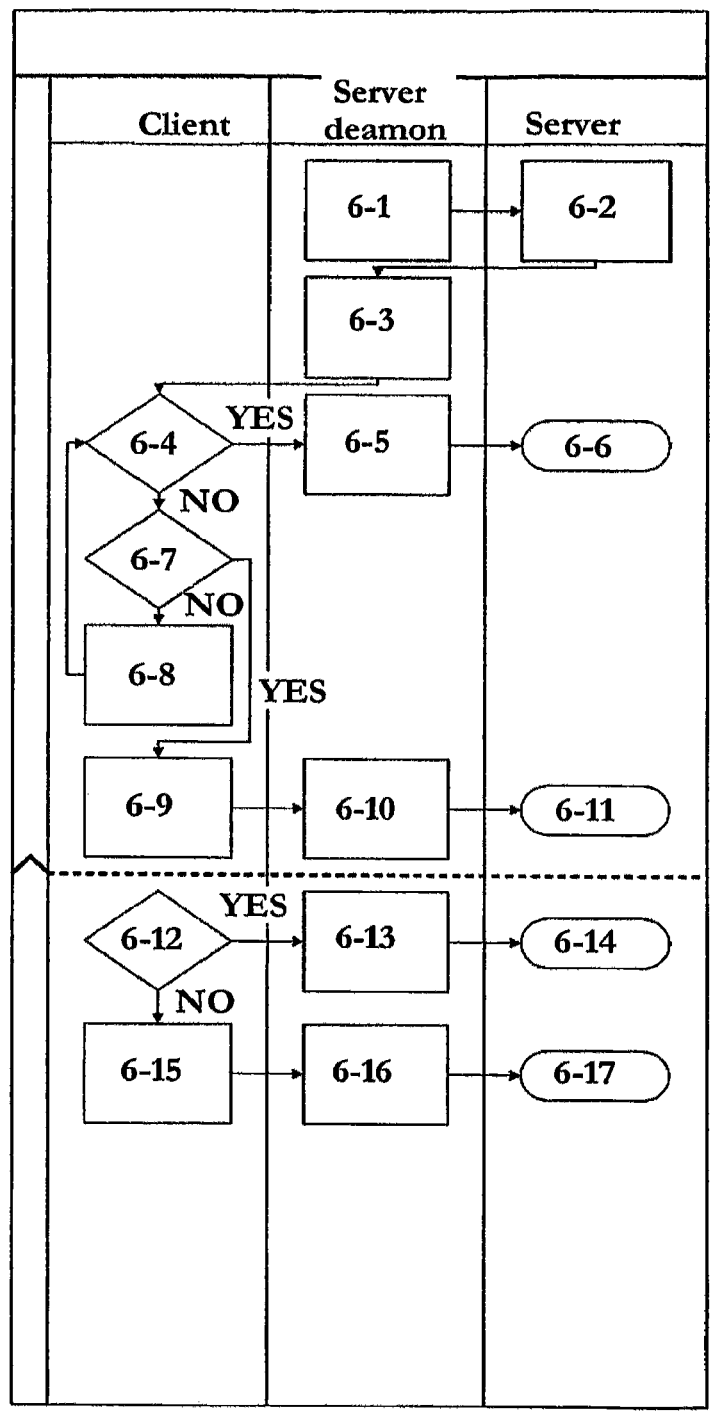

Printing: Second Stage (FIG. 6)

The server interrogates continuously the database of new print jobs. This is performed by first performing a search to find the printers on the network, which have print jobs in queue, and thereafter each queue is parsed to find all print jobs in the queue for the respective printer. This information is thereafter sorted by time stamp, i.e. when the print job came to the server. The FIFO-principle (FIFO, first in first out) is preferably employed, i.e. the oldest print job is processed first. The print jobs can also be sorted using other kinds of priority, i.e. if a print job has a higher priority than others, which are before in the queue, the print job with higher priority is moved before the print jobs with lower priority in the queue.

The server daemon, which monitors status of the printers in the network, is described in the end of this section.

When the server has found a print job, which is to be printed, the print job is fetched from the print queue (step 6-1) and marked for printing (step 6-2). The server then fetches information of the printer, on which the print job is to be printed. The server fetches information from different parts of the database. The IP-address for the printer and the kind of mechanism that shall be used for sending the print job from the client to the printer is collected. It also fetches information from another part of the database where status of the printers is stored. Status is collected by the daemon that supervises printers.

If status of the printer is something else than OK, a sequence is sent to the client telling that the printer is not operating and makes it possible for the client to either cancel the print job, select another printer, or wait for the printer to start operate again.

The sequence, which then is sent, is accordingly:

Sequence number

Error code.

If the printer is active, i.e. in operation, and also accessible, the server sends information to the client according to the following (step 6-3):

Sequence number

Job ID (the unique identifier)

The IP-address of the printer

Mechanism of printing.

The client then confirms start of printing by responding with a sequence, wherein it informs that the printing has been started (step 6-4).

If it was not possible to connect to the printer, another sequence (step 6-9) is sent, possibly after a number of failed attempts (step 6-7-step 6-8).

When the printing has successfully been started a sequence is sent according to:

Sequence number.

If on the other hand it was not possible to start the printing, the following sequence is sent:

Sequence number

Error code (cause to why).

When the server receives the response from the client, it checks which sequence it is (step 6-5 and step 6-10). When the printing has been started successfully, the server updates the status of the print job in the database to "being printed" (step 6-6). If, on the other hand, it was not possible to start the print job, the information for the printer is updated so that the daemon monitoring printers knows that it shall check the printer immediately (step 6-11). The connection between the server and the client is closed.

During the printing, the method of receiving, from the client, updated status information, which has been described above with reference to FIG. 2, is used (not illustrated here).

After a successful printing the following sequence is received from the client (step 6-12):

Sequence number

Job ID.

The received data is processed in the server (step 6-13), and the information of the successfully completed print job is moved to a separate table in the database, so that it can later be used for generating statistics and possibly invoicing information (step 6-14).

If the printing has not been completed, a sequence is received from the client according to (step 6-15):

Sequence number

Job ID

Error code.

The server processes received data (step 6-16), updates the information in the database, and marks the print jobs as failed. Further, information for the printer is updated so that the daemon monitoring printers knows that it should check the printer immediately (step 6-17).

The server may allow a plurality of print jobs to be printed simultaneously on a printer depending on the sizes of the print jobs and the memory or storage capacity of the printer in question. The server may monitor the number of print jobs and/or the amount of byte print jobs, which are active on a particular printer.

There is a possibility for the server to interrupt the print job (step 5-1 in FIG. 5) at whatever time. Then, the status of the print job is altered in the database to "being removed" (step 5-2), and the server contacts the client and tells it to cancel the print job, and thereafter to confirm it. The following sequence is sent from the server to the client (step 5-3):

Sequence number

Job ID.

When the client has cancelled the print job, it responds by sending back a sequence according to (step 5-4):

Sequence number.

The server processes the data (step 5-5), and cancels the print job from the database (step 5-6).

Note that the information of the clients and their print jobs, information of handling and updating of print queues, and information of status of printers normally are received from the clients according to what has been described above. Nevertheless, the server communicates directly with the printers to obtain further information of these, and possibly for confirming information received from the clients. More about this is described below.

Status Checking of Printers

The server daemon checks continuously status of printers. This is done by forwarding an SNMP-question (SNMP, Simple Network Management Protocol) to the respective printers. The information, which is received, is:

Status of the printer

Toner information (laser printers)

Paper information.

The information, which is checked, depends on what the printer model supports. Often, more information may be fetched, e.g. if the printer drum of a laser printer has to be changed, paper is stuck, etcetera.

If a printer status is inactive, i.e. "off-line", the server daemon intends to check the cause for this by checking whether paper is stuck, if toner is empty, if a drum has to be changed, etcetera.

The status of the printer in the database is updated to be "off-line", and the clients, which have print jobs, are informed by the server daemon that the printer is not operating and the client has the possibility to move the print job, to keep it in the queue, or to cancel it.

The information may also be sent to a helpdesk or similar department, which can attend to the problem of the printer. If the server daemon can confirm that the paper is empty the information can e.g. be sent to a specific department/person, whose assignments comprise to put some more paper into the printer etcetera.

The system is also continuously checking the database if a direct check of printer is needed. If it finds a printer, which has to be checked immediately, it does not wait until next time the printer normally shall be checked, but performs it immediately instead. This is done e.g. if a client has reported that it cannot connect to the printer.

Figure 7:
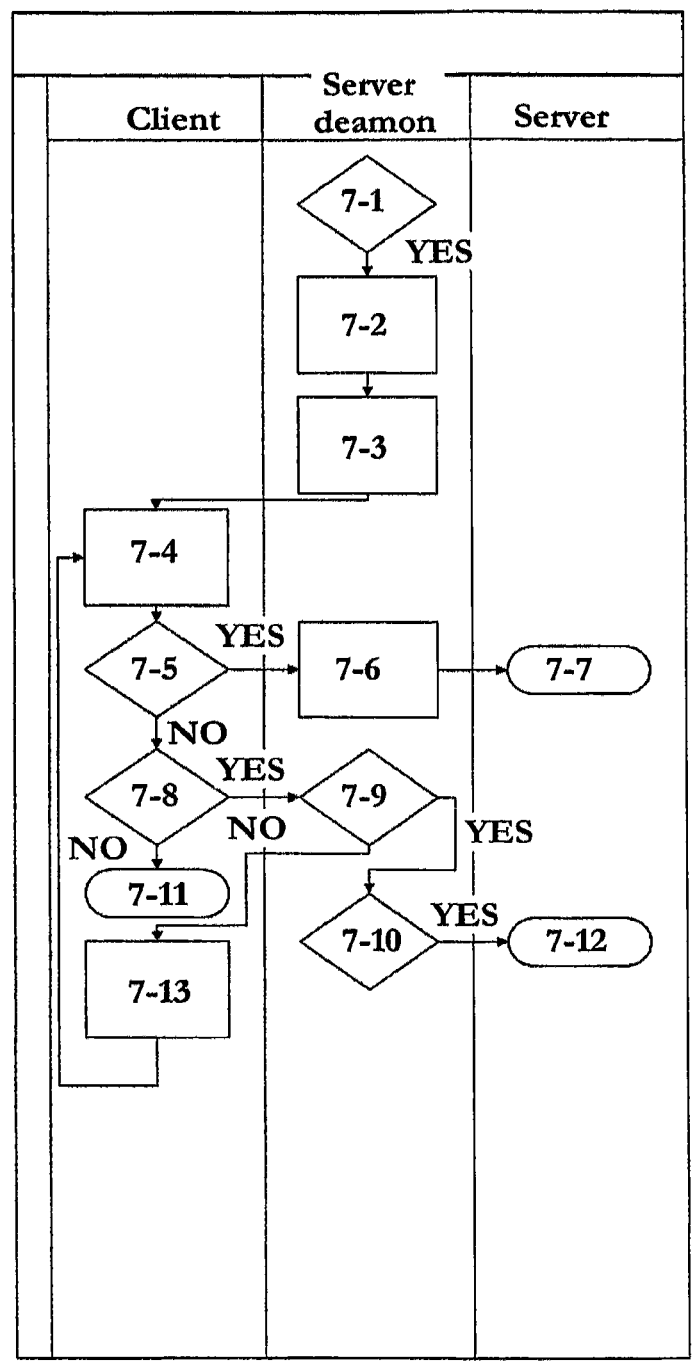

In FIG. 7 is shown a flow diagram of the communication between server and client in case the server daemon detects that a queue is not operating as it should.

Redundancy

In order to handle a shut down of the ticket server the network is preferably equipped with at least two ticket servers. In order to obtain a transparent transfer from one server to another, when the former is shut down by some reason, it is required that all data is replicated between the ticket servers. This can be performed by means of redundancy technique.

The clients may possibly be given possibility to choose either one of the ticket servers to cooperate with.

3. Detailed Description of a Client

In the system a main program and a number of subprograms are comprised, which together form the client depending on the operative system of the client. The main program is adapted to handle several print jobs simultaneously, and to process correct information for correct printing. Further, the programs have functionality in order to show dialogue windows with important information if something has happened with one or several print jobs, and information of the status of the respective print job.

When a client initiates a print job, i.e. requests a program to send a print job to a preinstalled printer for printing the main program takes over. Hereafter, a dialogue with the ticket server follows.

The client program starts with a request to obtain permission from the ticket server. This is done via RPC, blocking sockets or non-blocking sockets. The data is sent by hexadecimal notation to minimize the size of message, and is distorted by an XOR-algorithm.

In the first dialogue with the server the following information is sent (step 3-1 in FIG. 3)
Sequence number
Client version number
Operative system
Printer driver version
Printer name
User domain
User name.
A response from the server is received (step 3-5), which comprises
Sequence number
Job ID.

If the printer driver and/or the client version of the client program software is too old, or is not certified, an error code sequence will exchange the above said sequence (step 3-4). The sequence has the following information:
Sequence number
Error code.
If this occurs the client software will download correct version of either the driver or the client software from the server.

The client spools the print job, depending on size, either directly to the memory or to a catalogue on the computer's local hard disk drive. When the print job has been spooled to the memory or the hard disk drive further information of the print job is sent to the server. The print job is associated with the job ID, which has been received by the server, so that the print job can be identified when it is time for printing.

The following information is sent from the client to the server (step 3-6):
Sequence number
IP-address
Number of pages
Number of bytes.
Thereafter, a confirmation of the reception of information from the server is received, and a first dialogue part is completed (step 3-8).

Then, no further data is sent between client and server until the print job of the client is ready to be printed or that the printer no longer is accessible.

If the client is not on a NAT network it closes the TCP/IP-connection to the server (step 3-14).

When the printing is to be started, the server will start a new dialogue with the client. This dialogue is started with receiving the following information from the server (step 6-3 in FIG. 6):
Sequence number
Job ID
IP-address of printer
Printer connection—the kind of connection, over which the print job is going to be sent.
The client sends back a confirmation to the server that it has received the information and starts a direct printing towards the printer (step 6-4). Only a sequence number is sent:
Sequence number.
If the client cannot send the print job, or if something has occurred, so that the print job cannot be completed, a new sequence is sent with correct error code (step 6-9). This information is as follows:
Sequence number
Error code.

During the printing, the method of sending, from the client, updated status information as has been described above with reference to FIG. 2 may be employed (not illustrated here). When the printing is ready (if it will be ready) the client sends a new sequence to the ticket server indicating that the printing is completed (step 6-12). This sequence is as follows:
Sequence number
Job ID.

If a client interrupts the print job, the following sequence is sent from the client to the server (step 4-1 in FIG. 4):
Sequence number
Job ID
Error code.

The data is processed by the server (step 4-2), and the print job is cancelled from the database. The client receives from the server instructions to cancel the print job (step 4-3), after which the client cancels the print job from the memory or hard disk drive (step 4-4).

4. Alternative to a Printer for Use as a Shared Resource in Accordance with the Present Invention It shall be understood that while the preferred embodiments above have been described in connection with use of printers connected in the network, the present invention is not limited in this respect. More generally, printer can be exchanged for shared resource connected in the network. In this case the print queue is exchanged for queue for use of shared resource, print job is exchanged for job to be sent to shared resource, and printing is exchanged for sending the job. The shared resource can for instance be a transmitter device shared on the network, such as a telefax apparatus, a display unit shared on the network such as a digital projection apparatus, or a shared resource for storing data on a data storage medium on a network such as a CD- or a DVD-recorder. After suitable amendments the description above is applicable for such shared resource devices.

5. Advantages of the Technique

The advantages of the present invention comprises inter alia the following:
- Reduced network load. The invention reduces the need of network capacity since the processed job is always stored on the client before it is sent to the shared resource. The job is always sent directly to the shared resource—no intermediate storage on a server is needed.
- Scalability. The invention is scalable and is adapted for medium size to large enterprises. Since the product has low demands on internal bandwidth, the product can advantageously be used in multinational organizations. For instance, each server has capacity to handle 20000 queues and 100000 jobs simultaneously.
- Low load on the server gives faster use of the shared resource.
- Small demands of hard disk drive space on the server.
- Centralised administration and organization. A centralised solution gives large possibilities to achieve cost efficiency and active monitoring, which gives a maximum use of shared resources.
- Flexibility. The invention is flexible and can be used by most operative systems existing on the market today, which is supported by the manufacturers of shared resources. The solution can be adapted to new situations without any disturbances. Additional modules exist and can be implemented.
- Automated distribution and updating of inter alia drivers for the shared resources. When a new kind of shared resource becomes available on the market, or new drivers are released, these will be tested to then be distributed over the complete network. Patches and updates of components in the system follow the same procedure.
- Certification and testing. All components and drivers are certified and tested before being implemented in the environment of the client.
- Accessibility. The use of redundancy gives high accessibility.
- Remote monitoring and support. Monitoring of the shared resource, particularly paper and toner supply in case the shared resource is a printer, is available in the administration interface. This facilitates planning of maintenance of the shared resource, particularly replenishing toner and paper in case the shared resource is a printer, in order to minimize the shut down time on the shared resources of the enterprise.
- Economy. The invention is simple to implement and has low demands in respect of hardware, software and network capacity.
- Costs and use of the shared resources can be monitored on all levels, for instance on clients, departments, groups or shared resource.

The invention is obviously not limited to the above-described preferred embodiments, which are also shown on the drawings, but can be modified within the scope of the appended patent claims.

The invention claimed is:

1. A method for controlling and monitoring, from a server, transfers of jobs from clients connected in the network to shared resources connected in the network, the method comprising:
   receiving from a client connected in the network a request to be allowed to send a job to a selected shared resource connected in the network; and
   checking continuously whether said shared resource connected in the network is accessible and has capacity for receiving a job at present, wherein
   a go-ahead is sent to the client connected in the network that the client can send the job to the selected shared resource if the selected shared resource is accessible and has capacity to receive a job at present;
   the request is placed in a queue for the selected shared resource if the shared resource connected in the network is accessible but at present lacks capacity for receiving a job, the queue is updated, and a go-ahead is sent to the client connected in the network that the client can send the job to the selected shared resource when the request has advanced to the first position in said queue and the selected shared resource has capacity to receive a job; and
   the client connected in the network is notified if the selected shared resource is not accessible, wherein
   said step of receiving a request from a client connected in the network is followed by assigning an identity to the job, which is notified the client connected in the network, and said identity is comprised in the go-ahead, which is sent to the client connected in the network that the client can send the job to the selected shared resource, so that the client connected in the network based on said identity is capable of identifying said job;
   repetitively receiving at the server, from the client, updated status information regarding the completion of the job by the shared resource, the repetitively receiving of the updated status information occurring after the sending of the go-ahead, absence of the repetitively receiving indicating an operation error of the client or a communication error between the client and the server; and
   a confirmation that the job has been completed successfully by the shared resource or an indication of the fact that the job has not been completed successfully by the shared resource is received from the client, after which said request is removed from said queue.

2. A method for controlling and monitoring transfers of jobs from clients connected in a network to shared resources connected in the network, the method comprising:
   receiving, at a server, from a client connected in the network, a request to be allowed to send a job to a selected shared resource connected in the network;
   checking, by the server, whether the shared resource is accessible and has capacity for receiving the job at present;
   sending, when the selected shared resource is accessible and has capacity to receive the job at present, a go-ahead to the client that the client can send the job directly to the selected shared resource, and repetitively receiving at the server, from the client, updated status information regarding the completion of the job by the shared resource, the repetitively receiving of the updated status information occurring after the sending of the go-ahead, absence of the repetitively receiving indicating an operation error of the client or a communication error between the client and the server.

3. The method of claim 2, further comprising:
assigning an identity to the job, and
including the identity assigned to the job in the go-ahead so that the network may identify the job.

4. The method of claim 2, further comprising:
placing, when the selected shared resource is accessible but presently lacks capacity for receiving the job, the request in a queue for the selected shared resource, and
sending, when the request is in a first position in the queue and the selected shared resource has present capacity to receive the job, the go-ahead to the client that the client can send the job to the selected shared resource.

5. The method of claim 2, further comprising:
notifying, when the selected shared resource is not accessible, the client not to send the job.

6. The method of claim 2, further comprising:
receiving, from the client, after the repetitively receiving, a confirmation indicating that the job has been completed successfully by the shared resource or that the job has not been completed successfully by the shared resource; and removing the request from the queue upon receipt of the confirmation.

7. The method of claim 3, further comprising:
receiving a confirmation that the identity has been received by the client.

8. The method of claim 2, further comprising:
receiving a confirmation that the go-ahead has been received by the client.

9. The method of claim 8, wherein the confirmation that the go-ahead has been received also indicates that the job has been or will be sent to the shared resource directly.

10. The method of claim 2, wherein the shared resource is a printer and the job is a print job.

11. The method of claim 2, wherein the shared resource is a transmitter device, a telefax apparatus, a displaying unit, a projector, a device for storing data, a CD recorder, or a DVD recorder, and wherein the job is a job to send, display, or store data.

12. The method of claim 2, further comprising: sending information regarding a status of the shared resource to the client.

13. The method of claim 2, further comprising:
storing a version of client software for the client, the software relating to communication with the selected shared resource;
receiving, from the client, information of a version of the client software the client is using for communication with the selected shared resource;
comparing the version of the stored client software and the version of the client software in use; and
transferring a copy of the stored client software to the client or installing a copy of the stored client software on the client, executing the transferring or the installing if the comparing determines that the version of the stored client software is newer than the version of the client software in use.

14. The method of claim 13, wherein the receiving information of the version of the client software the client is using is executed with the receiving the request to be allowed to send the job to the selected shared resource.

15. The method of claim 2, wherein the request to be allowed to send the job to the selected shared resource includes a user domain and a user identity for the client, the method further comprising:
checking whether the client has authorization to send the job to the selected shared resource; and
sending an error code to the client, if the client does not have authorization to send the job to the selected shared resource.

16. The method of claim 15, further comprising:
checking, when the client has authorization to send the job to the selected shared resource, a user priority of the client; and
placing the request in a queue depending on the user priority of the client.

17. The method of claim 7, further comprising:
receiving, from the client, information of a size of the job.

18. The method of claim 17, wherein the receiving information of the size of the job is executed with the receiving the confirmation that the identity has been received.

19. The method of claim 2, further comprising:
continuously checking a status of shared resources in the network.

20. The method of claim 2, further comprising: continuously copying information regarding status of shared resources in the network, information regarding queues, information regarding clients, and information regarding jobs to a second server configured to control and monitor transfers of jobs.

21. A non-transitory computer-readable medium storing code portions that cause a server to execute:
receiving, from a client connected in the network, a request to be allowed to send a job to a selected shared resource connected in the network;
checking whether the shared resource is accessible and has capacity for receiving the job at present;
sending, when the selected shared resource is accessible and has capacity to receive the job at present, a go-ahead to the client that the client can send the job directly to the selected shared resource, and
repetitively receiving at the server, from the client, updated status information regarding the completion of the job by the shared resource, the repetitively receiving of the updated status information occurring after the sending of the go-ahead, absence of the repetitively receiving indicating an operation error of the client or a communication error between the client and the server.

22. The non-transitory computer-readable medium of claim 21, wherein the code portions are configured to be downloaded onto the server.

23. A network comprising: at least one server including the non-transitory computer-readable medium of claim 21.

24. A method of transferring a job from a client connected in a network to a shared resource connected in the network and selected by the client, comprising:
sending, to a server configured to control and monitor transfers of jobs to shared resources connected in the network, a request to be allowed to send the job directly to the selected shared resource;
receiving a go-ahead from the server to send the job to the selected shared resource;
sending the job directly to the selected shared resource, and repetitively sending from the client, to the server, updated status information regarding the completion of the job by the shared resource, the repetitively sending of the updated status information occurring after the receiving the go-ahead, absence of the updated status information on the server indicating an operation error of the client, or a communication error between the client and the server.

25. A non-transitory computer-readable medium storing code portions that cause a client terminal to execute the method of claim 24.

26. The method of claim 24, wherein the server is configured to assign an identity to the job and communicate the identity to the client, the method further comprising:
sending a confirmation that the assigned identity has been received by the client.

27. The method of claim 24, further comprising:
sending a confirmation, to the server, that the go-ahead has been received by the client.

28. The method of claim 27, wherein the confirmation that the go-ahead has been received includes a confirmation that the job has been or will be sent to the shared resource.

29. The method of claim 24, wherein the shared resource is a printer and the job is a print job.

30. The method of claim 24, wherein the shared resource is a transmitter device, a telefax apparatus, a displaying unit, a projector, a device for storing data, a CD recorder, or a DVD recorder, and wherein the job is a job to send, display, or store data.

31. The method of claim 24, further comprising:
sending, to the server, information of a version of client software the client is using for communication with the selected shared resource; and
receiving, from the server, a copy of client software stored by the server, if the client software stored by the server is a newer version than the client software the client is using.

32. The method of claim 31, wherein the sending information of the version of the client software the client is using is executed with the sending the request to be allowed to send the job to the selected shared resource.

33. The method of claim 24, wherein the request to be allowed to send the job to the selected shared resource includes a user domain and a user identity for the client, the method further comprising: receiving, when the client does not have authorization to send the job to the selected shared resource, an error code from the server.

34. The method of claim 26, further comprising:
sending information of a size of the job to the server.

35. The method of claim 34, wherein the sending information of the size of the job is executed with the sending the confirmation that the assigned identity has been received.

\* \* \* \* \*